US009738332B2

(12) United States Patent
Garceau et al.

(10) Patent No.: US 9,738,332 B2
(45) Date of Patent: Aug. 22, 2017

(54) KINGPIN STABILIZER

(71) Applicant: NORCO INDUSTRIES, INC., Elkhart, IN (US)

(72) Inventors: Bernard F. Garceau, Vandalia, MI (US); Bori Krobot, LaPorte, IN (US)

(73) Assignee: Norco Industries, Inc., Elkhart, IN (US)

( * ) Notice: Subject to any disclaimer, the term of this patent is extended or adjusted under 35 U.S.C. 154(b) by 0 days.

(21) Appl. No.: 15/155,571

(22) Filed: May 16, 2016

(65) Prior Publication Data

US 2016/0257356 A1 Sep. 8, 2016

Related U.S. Application Data

(63) Continuation of application No. 13/973,208, filed on Aug. 22, 2013, now Pat. No. 9,340,080.

(60) Provisional application No. 61/692,172, filed on Aug. 22, 2012.

(51) Int. Cl.
*B62D 53/08* (2006.01)
*B60D 1/66* (2006.01)
*F16M 11/32* (2006.01)
*B60D 1/01* (2006.01)
*B62D 63/08* (2006.01)

(52) U.S. Cl.
CPC ......... *B62D 53/0871* (2013.01); *B60D 1/015* (2013.01); *B60D 1/66* (2013.01); *B62D 53/0842* (2013.01); *B62D 63/08* (2013.01); *F16M 11/32* (2013.01)

(58) Field of Classification Search
CPC ........ F16M 11/04; F16M 11/16; F16M 11/32; B62D 53/0871; B62D 53/0857; B62D 53/0864
See application file for complete search history.

(56) References Cited

U.S. PATENT DOCUMENTS

| | | | | |
|---|---|---|---|---|
| 1,316,735 A | * | 9/1919 | Olds | B62D 53/0857 280/429 |
| 2,323,473 A | * | 7/1943 | Korling | F16M 11/10 248/183.1 |
| 3,143,083 A | * | 8/1964 | Gutridge | B61D 45/00 105/392.5 |
| 3,189,307 A | * | 6/1965 | Peterson | B61D 45/005 403/14 |

(Continued)

OTHER PUBLICATIONS

King Pin Stabilizing Jack (Bipod), BAL-Innovative Products for the RV Industry, Sep. 9, 2005, pp. 1-2, http://www.norcoind.com/bal/products/consumer/stabilizing_product . . . .

(Continued)

*Primary Examiner* — Gary C Hoge
(74) *Attorney, Agent, or Firm* — Vorys, Sater, Seymour and Pease LLP; Mark A. Watkins, Esq.

(57) ABSTRACT

A kingpin stabilizer having a kingpin-retaining bracket having a base plate and upwardly extending walls along at least two sides of the base plate. The upwardly extending walls and the base plate forming a receiving cavity with the upwardly extending walls spaced apart to fit said kingpin therebetween. At least one upwardly extending wall has a pin retainer. The stabilizer includes three telescoping legs extending from the pin-retaining bracket forming a tripod.

15 Claims, 8 Drawing Sheets

(56) References Cited

U.S. PATENT DOCUMENTS

| | | | | |
|---|---|---|---|---|
| 3,392,944 | A | * | 7/1968 | Wyrough ............. B61D 45/005 280/425.1 |
| 4,199,123 | A | * | 4/1980 | Weber ................... F16M 11/34 248/168 |
| 4,260,174 | A | * | 4/1981 | Lavens ............. B62D 53/0864 280/103 |
| 4,268,066 | A | * | 5/1981 | Davis ....................... B60S 9/06 248/352 |
| 4,548,418 | A | * | 10/1985 | Wendorff ........... B62D 53/0857 248/352 |
| 4,570,887 | A | * | 2/1986 | Banister ................. F16M 11/02 248/187.1 |
| 4,596,371 | A | * | 6/1986 | Clark ....................... B60S 9/04 248/354.3 |
| 4,641,729 | A | | 2/1987 | Beck et al. |
| 4,708,362 | A | * | 11/1987 | Raetz ....................... B60S 9/04 280/763.1 |
| 4,905,953 | A | * | 3/1990 | Wilson ..................... B60S 9/04 248/352 |
| 4,929,973 | A | * | 5/1990 | Nakatani ................ F16M 11/04 248/177.1 |
| 4,949,809 | A | | 8/1990 | Levi et al. |
| 5,165,265 | A | | 11/1992 | Maionchi |
| 5,197,311 | A | * | 3/1993 | Clark .................... B60R 25/001 248/352 |
| D344,969 | S | * | 3/1994 | Nakatani ...................... D16/244 |
| 5,474,330 | A | | 12/1995 | Meehleder |
| 5,520,030 | A | * | 5/1996 | Muldoon ................. B60D 1/60 248/352 |
| 5,575,492 | A | | 11/1996 | Stone |
| 6,062,524 | A | * | 5/2000 | Jackson, Sr. ............. B60D 1/66 248/352 |
| 6,109,078 | A | | 8/2000 | Marshall |
| 6,170,851 | B1 | * | 1/2001 | Lindenman ........ B62D 53/0835 280/434 |
| 6,334,279 | B1 | | 1/2002 | Oliver et al. |
| 6,491,317 | B1 | * | 12/2002 | Breese ............... B62D 53/0828 280/432 |
| 6,547,270 | B1 | * | 4/2003 | Breese ................... B62D 53/10 280/432 |
| 6,695,348 | B2 | | 2/2004 | Holly |
| 6,739,559 | B2 | * | 5/2004 | Nakatani ................ F16M 11/02 248/187.1 |
| 6,910,666 | B2 | | 6/2005 | Burr |
| 2005/0110260 | A1 | | 5/2005 | Jacques |
| 2008/0267613 | A1 | * | 10/2008 | Darrow .................. F16M 11/04 396/428 |
| 2011/0011678 | A1 | * | 1/2011 | Sheffield ................... E04G 1/24 182/141 |

OTHER PUBLICATIONS

King Pin Stabilizing Jack (Tripod), BAL-Innovative Products for the RV Industry, Sep. 9, 2005, pp. 1-2, http://www.norcoind.com/bal/products/consumer/stabilizing_product . . . .
Twin Pin Stabilizing Jack Model 25038 Assembly and Operating Instructions, BAL-Innovative Products for the RV Industry, 2005.
King Pin Stabilizing Jacks, BAL-Innovative Products for the RV Industry, Dec. 7, 2004.
King Pin Tripod Stabilizing Jacks, BAL-Innovative Products for the RV Industry, Dec. 7, 2004.
King Pin Stabilizing Jack Model 25015 Assembly and Operating Instructions, BAL-Innovative Products for the RV Industry, 2000.
King Pin Stabilizing Jack Model 25035 Assembly and Operating Instructions, BAL-Innovative Products for the RV Industry, 2000.

* cited by examiner

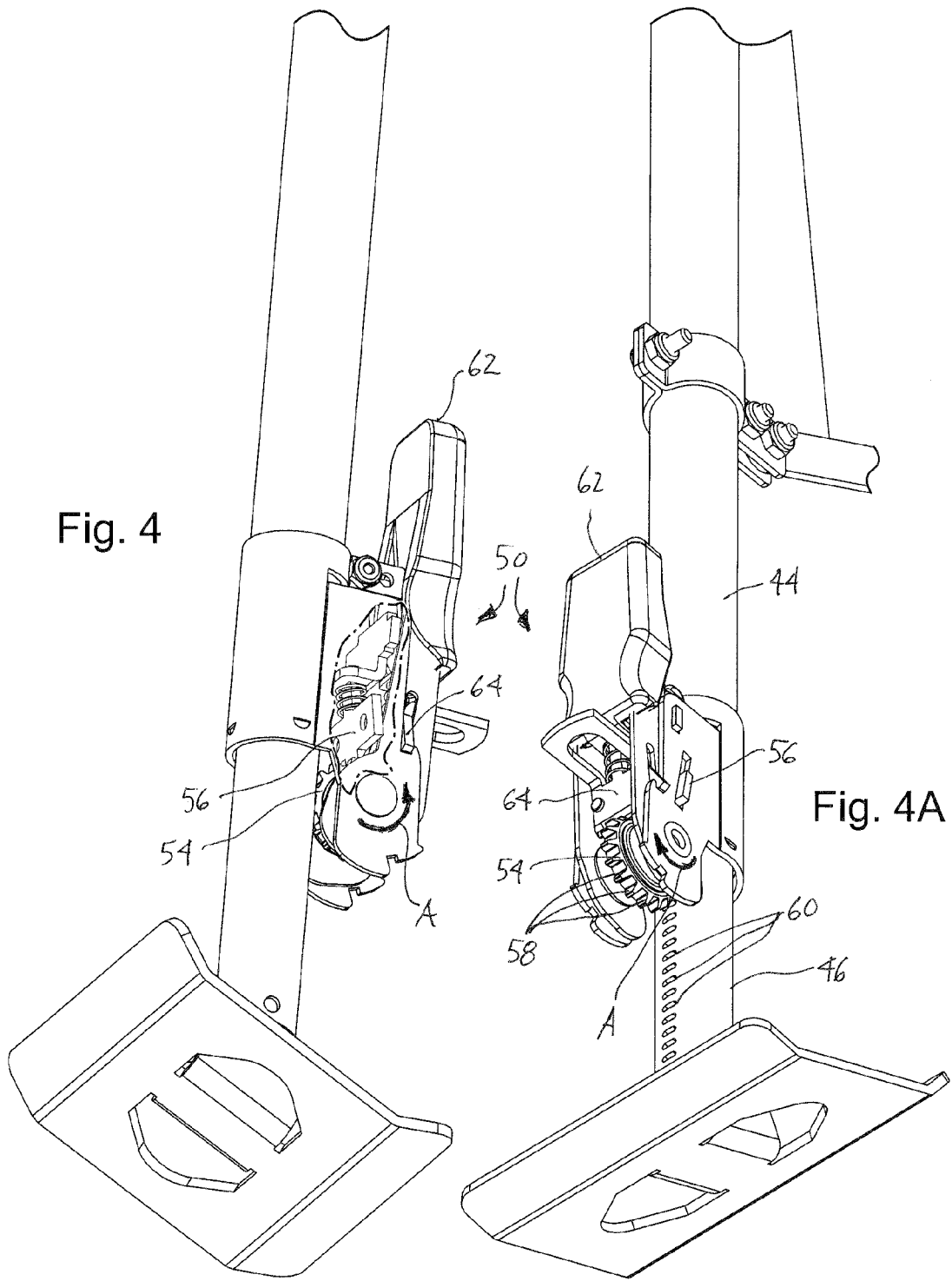

KINGPIN STABILIZER

CROSS-REFERENCE TO RELATED APPLICATIONS

This application claims priority to U.S. patent application Ser. No. 13/973,208 filed Aug. 22, 2013, and U.S. Provisional Patent Application Ser. No. 61/692,172 filed Aug. 22, 2012, the disclosures of which are incorporated by reference herein in their entirety.

BACKGROUND AND SUMMARY

This invention relates generally to stabilizers for fifth-wheel or kingpin trailers.

Various types of recreational vehicles and other trailers are supported and stabilized after the recreational vehicle or trailer has been detached from the towing truck or vehicle.

Certain recreational vehicles and other trailers are coupled to the towing truck or vehicle using a fifth-wheel coupling. A fifth-wheel coupling includes a kingpin mounted to the front of the trailer positioned to engage a pin-receiving coupler, called a fifth wheel, on the rear of the towing vehicle. The fifth-wheel receives and retains the kingpin forming the trailer coupling. Typically, a portion of the trailer with the kingpin extends forward over a rear portion of the towing vehicle to engage the fifth-wheel. Thus, the front section of a fifth-wheel trailer extends in an unsupported and possibly unbalanced condition when the recreational vehicle or trailer is detached from the towing truck.

In the past, kingpin stabilizers were installed by setting the legs of a stabilizer on the ground, then raising a connection piece into place around the kingpin.

Disclosed is a kingpin stabilizer comprising a kingpin-retaining bracket and telescoping legs extending from the pin-retaining bracket.

A method of stabilizing a kingpin is disclosed comprising steps of engaging a kingpin-retaining bracket of a kingpin stabilizer onto a kingpin, and extending telescoping legs extending from the kingpin-retaining bracket forming a tripod beneath the kingpin such that each telescoping leg contacts the ground.

BRIEF DESCRIPTION OF THE DRAWINGS

FIG. 4 is a perspective view of a ratchet mechanism of the present kingpin stabilizer with a cut-away showing a spring-loaded lock plate of the mechanism;

FIG. 4A is another perspective view of the ratchet mechanism of FIG. 4;

DETAILED DESCRIPTION OF THE DRAWINGS

Figure 1:
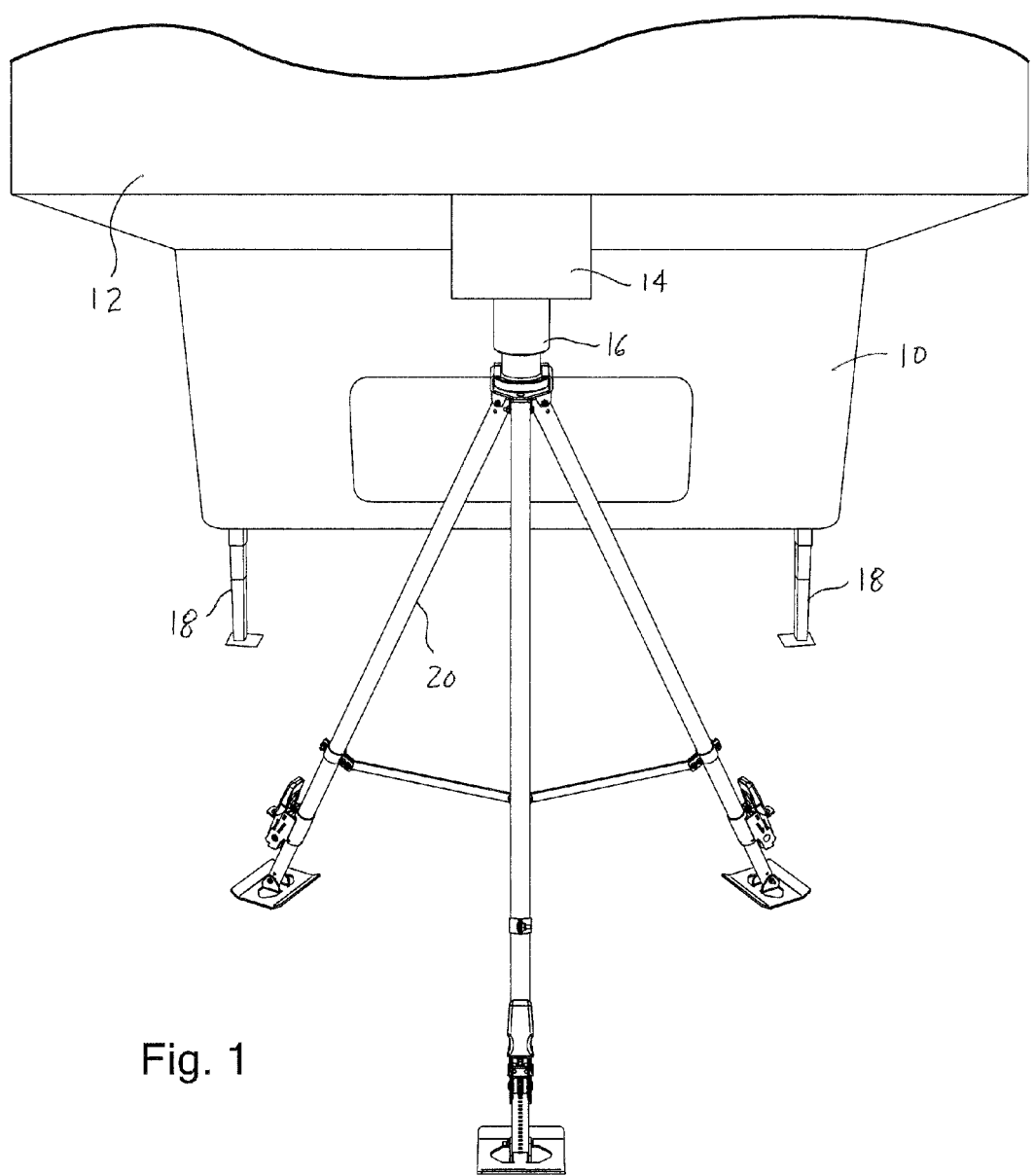
FIG. 1 is a partial front view of a kingpin stabilizer of the present invention attached to a kingpin of a trailer in an installed position.

A front view of a fifth wheel travel trailer 10 is shown in FIG. 1 having a front extension 12 extending forward at the front of the trailer 10. Typically, the trailer front extension 12 includes living quarters such as a bedroom or other space. Attached to the underside of the trailer front extension 12 is a pin box 14 that has a kingpin 16 attached to its underside. The kingpin 16 is used to connect the trailer 10 to a "fifth wheel" pin-receiving coupler in the towing vehicle (not shown).

Trailer 10 may include support extensions 18, usually one near each corner of the trailer 10. After the trailer 10 has been positioned in a parking space, the support extensions 18 may be lowered to the ground and used to level and support the trailer 10.

As shown in FIG. 1, after the trailer 10 has been unhitched from the towing vehicle, the trailer front extension 12 and front of the trailer may be stabilized using a kingpin stabilizer 20. The kingpin stabilizer 20 includes a kingpin-retaining bracket 22 and three telescoping legs 24 extending from the kingpin-retaining bracket 22 forming a tripod.

The present kingpin stabilizer 20 is attachable to the kingpin 16 prior to being extended to a desired length. By attaching the stabilizer 20 to the kingpin 16 before extending the legs, the top of the stabilizer is held in place, assisting the user in deploying the stabilizer quickly and easily.

In one alternative, the kingpin-retaining bracket 22 has a base plate 26 and upwardly extending walls 28 along at least two sides of the base plate 26. The upwardly extending walls 28 and the base plate 26 form a receiving cavity 30 having a size and shape adapted to receive a portion of the kingpin 16.

Typically, the kingpin 16 is a cylindrical pin with an annular groove 34 forming a kingpin head 36 at the outward end of the kingpin. The kingpin-retaining bracket 22 is configured to receive and attach to the kingpin 16 and may vary to accommodate different kingpin configurations. The kingpin-retaining bracket 22 includes one or more upwardly extending members that extend upwardly about at least a portion of a periphery of the kingpin 16 when the kingpin is installed. In the example shown, the upwardly extending members are positioned about three sides of the kingpin 16 when the kingpin is installed. The upwardly extending members may support one or more pin retainers that extend inwardly into the annular groove 34 to secure the retaining bracket 22 to the kingpin 16. In the example shown, the upwardly extending members are upwardly extending walls 28 of the kingpin-retaining bracket 22 spaced apart to fit the kingpin head 36 therebetween.

One or more of the upwardly extending walls includes a pin retainer 38. In the embodiment shown, the pin retainer 38 is a flange on each of the upwardly extending walls 28 oriented toward the receiving cavity 30, the flange 38 being offset from the base plate 26. Alternatively, the pin retainer 38 may be provided on two or more upwardly extending members. In yet another alternative, the pin retainer 38 may be provided on one upwardly extending member. In the embodiment shown, the flanges 38 are positioned to extend into the groove 34 of the kingpin 16 when the stabilizer 20 is installed on the kingpin. The pin retainer 38 may have other forms including but not limited to one or more set screw, clip, rod, pin, collar, or other retainer that extends into the annular groove 34 retaining the kingpin.

In one embodiment, the kingpin-receiving bracket includes a pin retainer in the form of one or more set screw, clip, rod, pin, bolt, collar, or combination thereof extending from one upwardly extending member inwardly to engage the kingpin groove 34 and retain the kingpin head 36 in the kingpin-retaining bracket. Alternatively, the kingpin-receiving bracket includes a pin retainer in the form of one or more set screw, clip, rod, pin, bolt, collar, or combination thereof extending from or between two or more upwardly extending members inwardly to engage the kingpin groove 34 and retain the kingpin head 36 in the kingpin-retaining bracket. In one example, the kingpin-receiving bracket includes two upwardly extending members forming a U-shaped bracket, with two pins or bolts extending between and constrained by the two upwardly extending members, each positioned to engage the groove of the kingpin in the U-shaped bracket on opposite sides of the kingpin, and at least one of the pins being removable for engaging and disengaging the kingpin.

Figure 3:
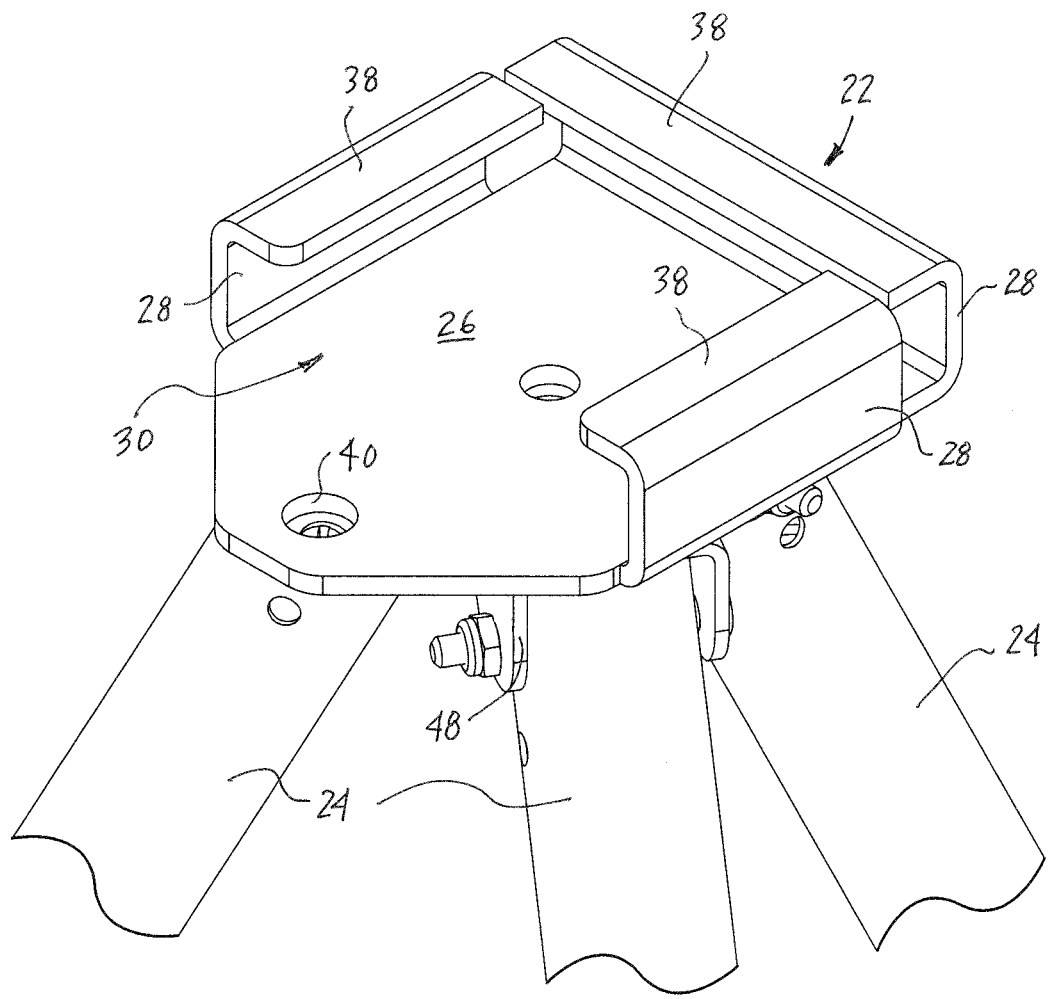
FIG. 3 is a perspective detail view of a kingpin-retaining bracket of the present kingpin stabilizer of FIG. 2.

As shown in FIG. 3, the kingpin stabilizer 20 may include upwardly extending walls 28 along three sides of the base plate 26. The three upwardly extending walls 28 and the base plate 26 form the receiving cavity 30. As shown in FIG. 3, the upwardly extending walls 28 are spaced apart to fit the kingpin in the receiving cavity 30 formed between the walls.

Figure 3A:
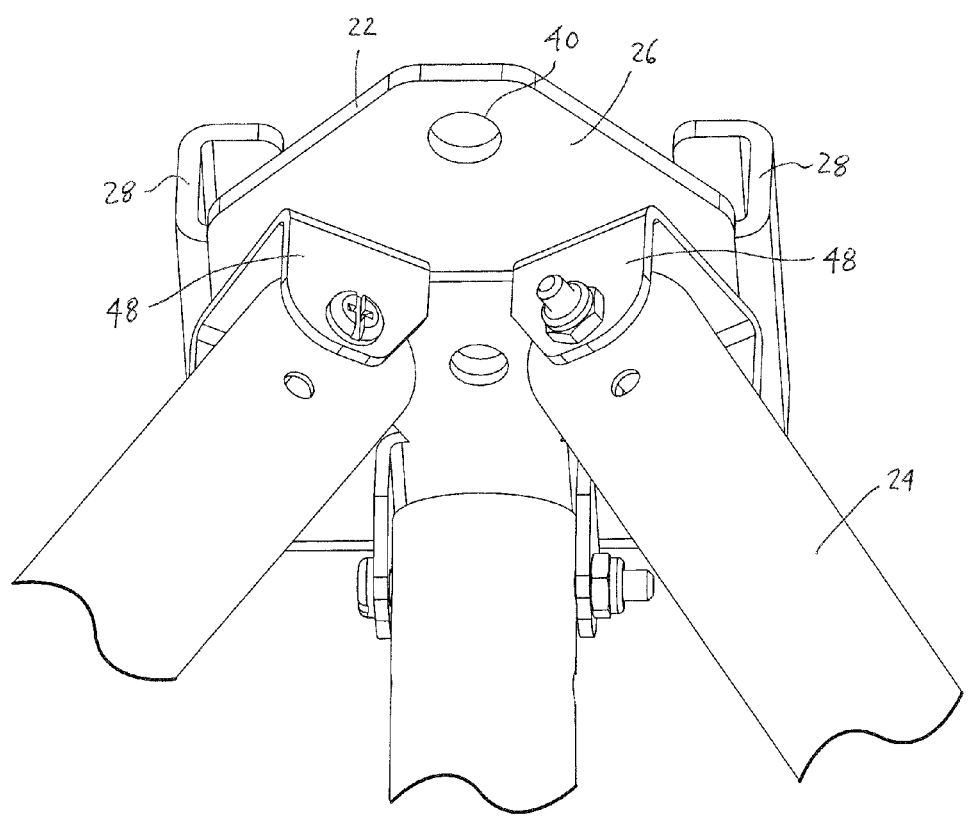
FIG. 3A is a perspective detail view of an underside of the kingpin-retaining bracket of FIG. 3.
Figure 3B:
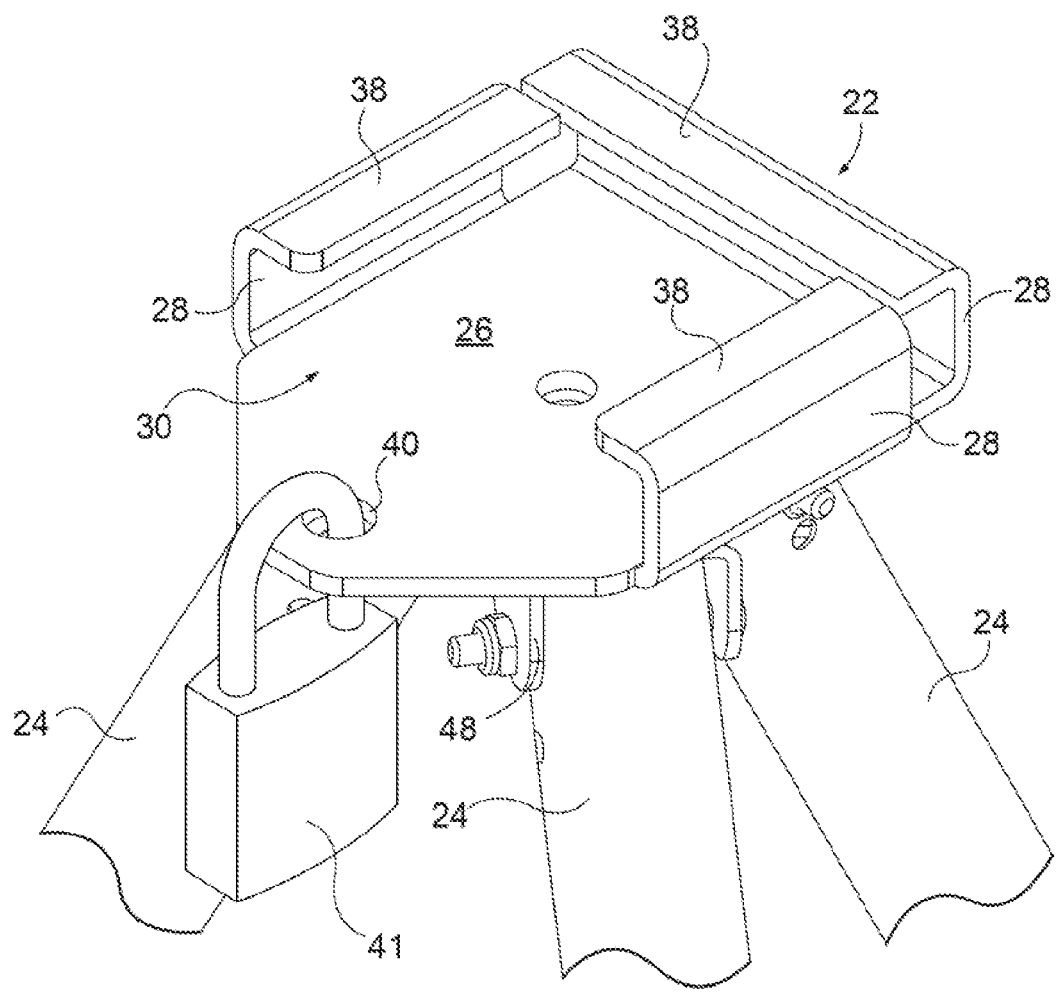
FIG. 3B is a perspective detail view of a kingpin-retaining bracket according to one embodiment.

The base plate 26 may include a lock aperture 40 adjacent the entrance to the receiving cavity 30, such as shown by example in FIGS. 3 and 3A. A padlock, snap clip, lock pin, pin, clip, or other retainer may be placed through the lock aperture 40 to hold the kingpin-retaining bracket 22 on the kingpin 16, An exemplary padlock 41 is illustrated in FIG. 3B.

Figure 2:
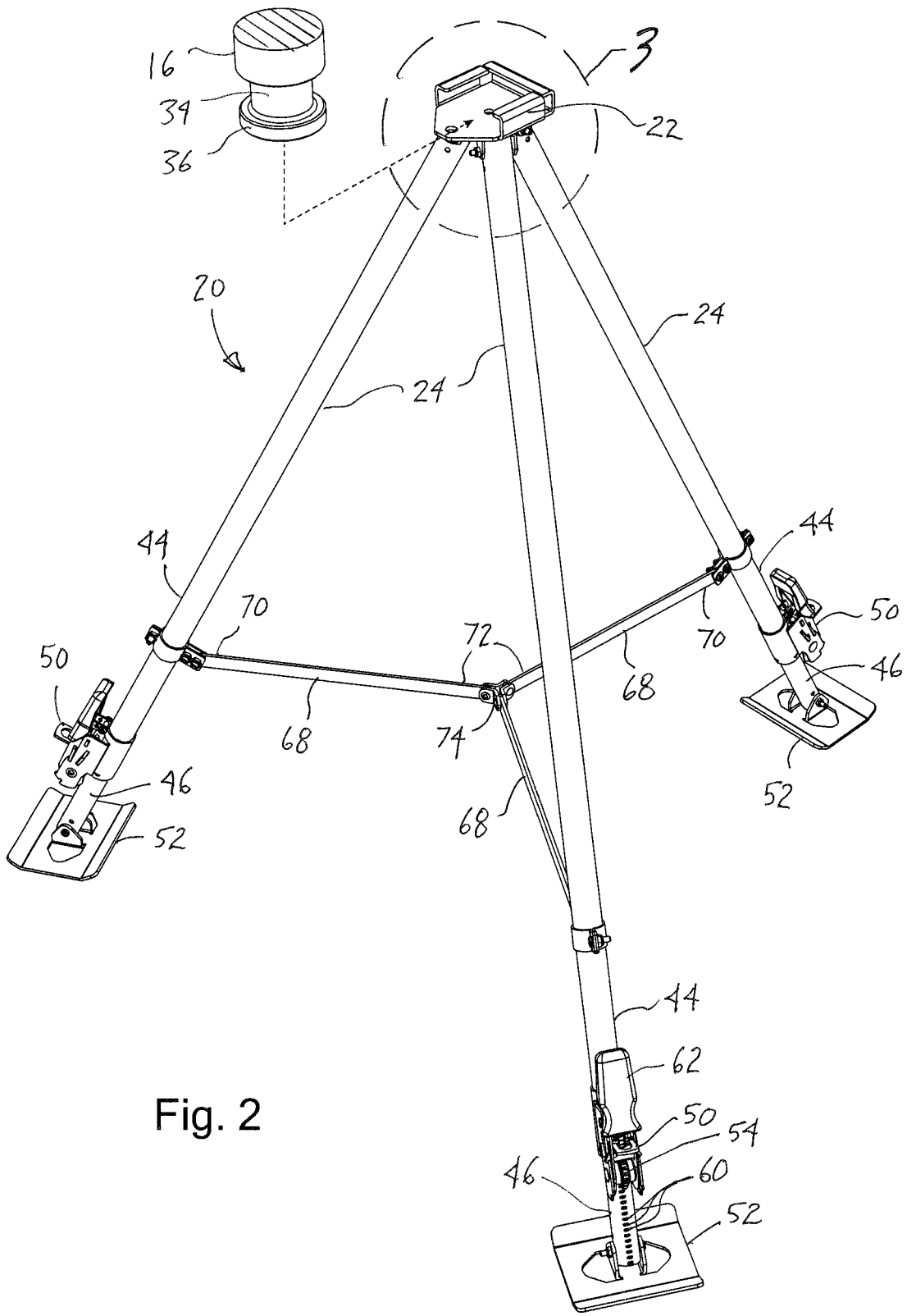
FIG. 2 is a perspective exploded view of the kingpin stabilizer of FIG. 1 in an unextended position with a kingpin shown in an uninstalled position.
Figure 6:
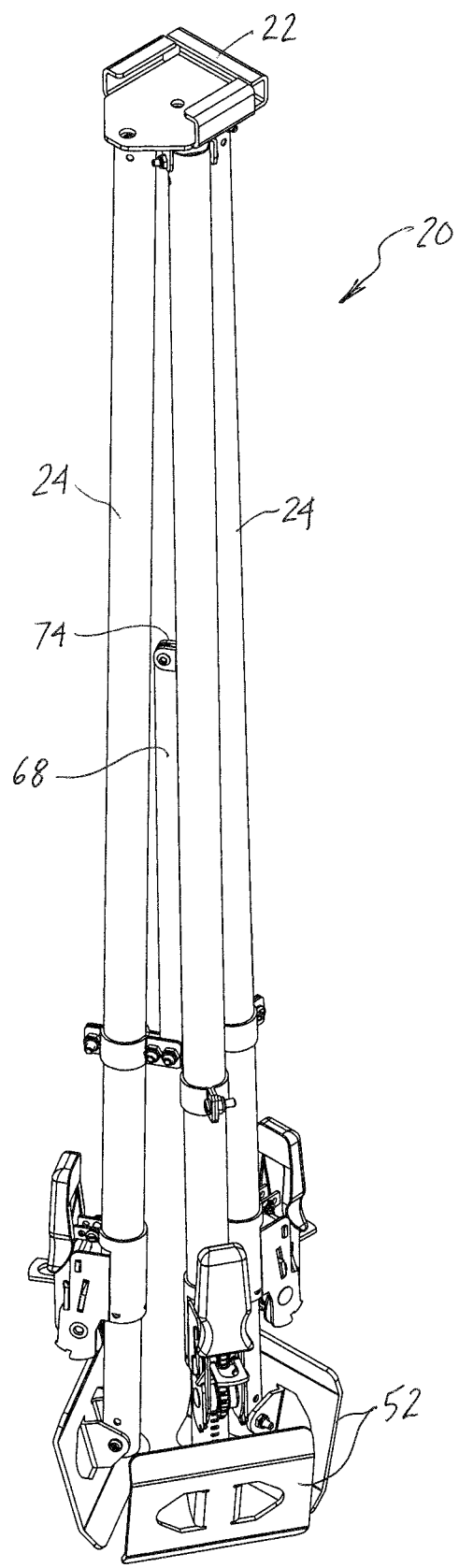
FIG. 6 is a perspective view of the kingpin stabilizer of FIG. 2 with legs in a storage position.

As shown in FIG. 2, the kingpin stabilizer 20 may also include a retaining bar 68 for each leg, each retaining bar 68 having a first end 70 pivotably connected to a respective telescoping leg 24 and a second end 72 pivotably connected to a center pivot 74. The legs 24 of the stabilizer 20 may be pivoted together for storage when not in use, the retaining bars 68 pivoting together positioned between the legs 24, such as shown in FIG. 6.

The telescoping legs 24 extending from the kingpin-retaining bracket 22 may include an outer tube 44 and a telescoping inner leg 46 slidably positioned within the outer tube 44. The outer tubes 44 are pivotably attached to the kingpin-retaining bracket 22. The kingpin-retaining bracket 22 may include a leg bracket 48 pivotably receiving the telescoping legs 24. The leg bracket 48 may be integrally formed with the kingpin-retaining bracket 22 or may be attached thereto. The outer tubes 44 may be connected to the kingpin-retaining bracket 22 using bolts, rivets, pins, or other axial fastener enabling pivotable movement of the outer tube. In the alternative shown in FIGS. 1 and 2, one or more of the telescoping legs 24 includes a ratchet mechanism 50 controlling the extension of the inner leg 46 from the outer tube 44. The inner leg 46 may be a tube. Alternatively, the inner leg 46 may be a rod. The cross-sectional shape of the telescoping legs 24 may be circular, square, rectangular, or any other arcuate, polygonal, or other cross-sectional shape as desired for the application. Each telescoping leg 24 may include a foot pad 52.

The ratchet mechanism 50 includes a ratchet wheel 54 operably engaging the telescoping inner leg 46. In one alternative, the ratchet wheel 54 includes a plurality of serrations or teeth 58 around the peripheral surface of the ratchet wheel 54 positioned to engage corresponding grooves or recesses 60 along the outer surface of the inner leg 46, such that rotation of the ratchet wheel 54 in a forward rotation, in the direction shown by the arrow in FIGS. 4 and 4A as reference "A," causes the inner leg 46 to extend from the outer tube 44, and rotation of the ratchet wheel 54 in a backward rotation causes the inner leg 46 to retract into the outer tube 44. The recesses 60 along the inner leg 46 are typically linearly arranged and spaced the same as the arc length tooth-to-tooth spacing on the ratchet wheel 54, operating similarly to a rack and pinion.

A spring-loaded lock plate 56 operably engages the ratchet wheel 54 resisting backward rotation of the ratchet wheel. The lock plate 56 includes a chamfered end on one side such that forward rotation of the ratchet wheel 54 engages a corresponding surface on the ratchet wheel teeth 58 acting as a cam to press the spring-loaded lock plate 56 against its spring away from the ratchet wheel allowing the tooth to advance past the lock plate in the forward direction. The shape of the lock plate 56 is such that movement of the ratchet wheel in backward rotation cannot cam the lock-plate out of the way so that movement of the ratchet wheel in backward rotation engages the teeth 58 of the ratchet wheel 54 against the lock plate 56 resisting backward rotation.

The ratchet mechanism 50 includes a lever 62 pivotable about the rotational axis of the ratchet wheel rotatable between a first position and a second position. The lever 62 includes a spring-loaded advance plate 64 slideable toward the ratchet wheel 54 to engage the ratchet wheel and slideable away from the ratchet wheel to disengage the ratchet wheel. When the advance plate 64 is in a position toward the ratchet wheel 54, the advance plate 64 engages the ratchet wheel 54 such that motion of the lever 62 in a first direction toward the lever first position rotates the advance plate 64 and the ratchet wheel 54 in forward rotation extending the telescoping inner leg 46. The spring-loaded advance plate 64 may be positioned to engage the teeth 58 of the ratchet wheel 54 and shaped with a chamfered end on one side so that forward rotation of the ratchet wheel 54, and motion of the lever 62 in a second direction opposite the first direction, engages a corresponding surface on the ratchet wheel teeth 58 acting as a cam to press the spring-loaded advance plate 64 against its spring away from the ratchet wheel allowing the tooth to advance past the advance plate in the forward direction. The shape of the spring-loaded advance plate 64 is such that motion of the lever 62 in the first direction, and movement of the ratchet wheel in backward rotation, cannot cam the advance-plate out of the way such that motion of the lever 62 in the first direction engages the teeth 58 of the ratchet wheel 54 against the advance plate 64 rotating the advance plate 64 and the ratchet wheel 54 in forward rotation.

Figure 5:
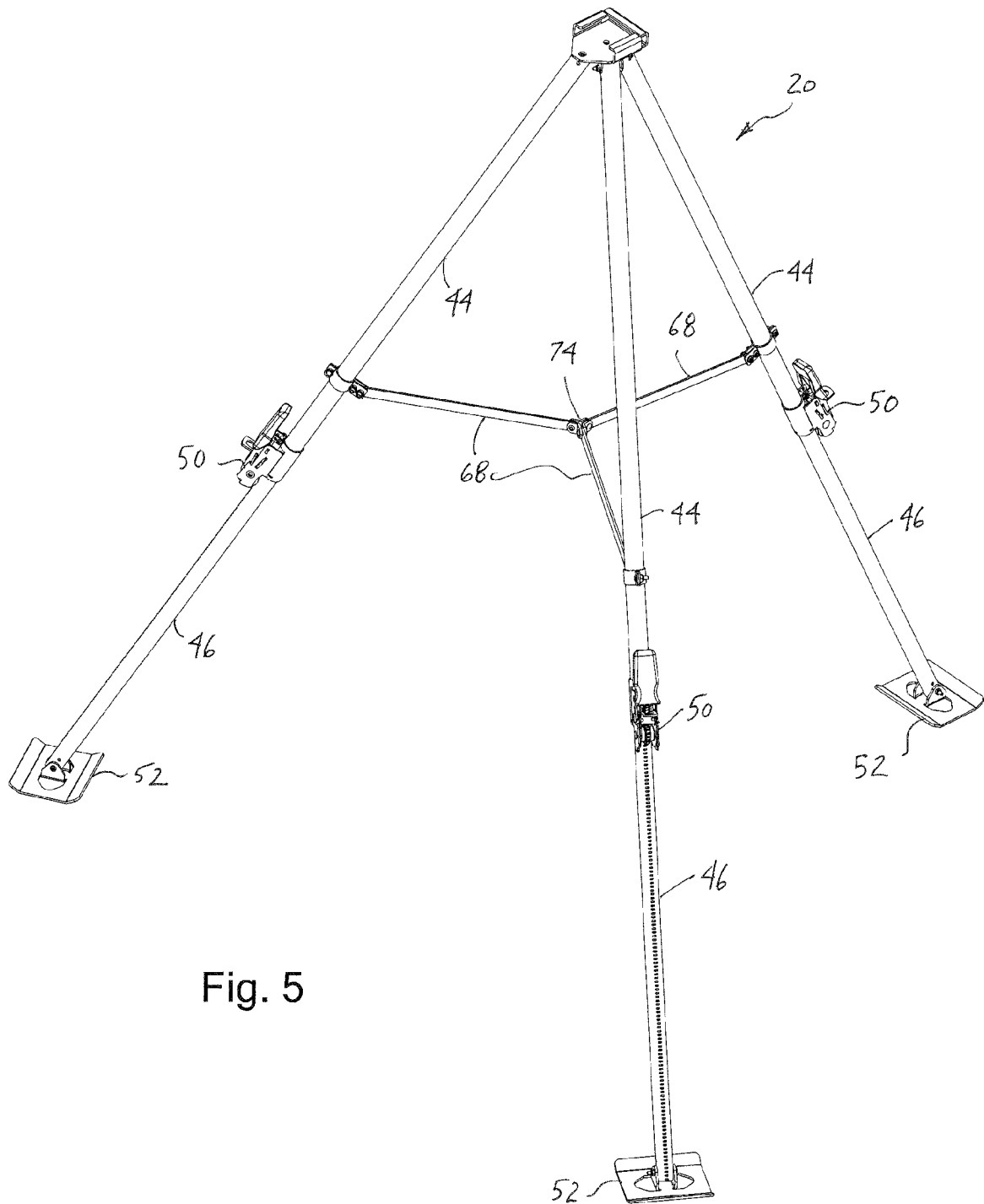
FIG. 5 is a perspective view of the kingpin stabilizer of FIG. 2 with legs extended.

The ratchet mechanism 50 may be used to extend the telescoping inner leg 46 by pressing the lever 62 in the first direction from the lever second position toward the lever first position to rotate the advance plate 64 and the ratchet wheel 54 in forward rotation extending the telescoping inner leg 46 an amount corresponding to the rotation of the ratchet wheel. Then, moving the lever 62 in the second direction opposite the first direction toward the lever second position while the ratchet wheel remains stationary to reengage the advance plate 64 against distal ratchet wheel teeth 58 for forward rotation. Then returning the lever 62 in the first direction toward the lever first position to rotate the advance plate 64 and the ratchet wheel 54 in forward rotation further extending the telescoping inner leg 46. The user may continue the ratcheting action until the telescoping inner leg 46 is extended a desired distance, such as shown in FIG. 5.

The spring-loaded lock plate 56 and spring-loaded advance plate 64 are positionable by a user to disengage the ratchet wheel 54 so that the telescoping leg can be extended or retracted without engagement of the ratchet mechanism. In one alternative shown in FIG. 4, moving the lever 62 in the second direction beyond the lever second position to a release position disengages the spring-loaded lock plate 56 and spring-loaded advance plate 64 from the ratchet wheel 54 so that the inner leg 46 is slideable into and out of the outer tube 44 without engagement of the ratchet mechanism. The spring-loaded lock plate 56 may include extending tabs engageable by a portion of the lever to disengage the lock plate when the lever is in the release position, and the spring-loaded advance plate 64 may include extending tabs engageable by a portion of the ratchet mechanism housing to disengage the advance plate when the lever is in the release position. In use, it is contemplated that a user may hang the unextended stabilizer onto a kingpin by the kingpin-retaining bracket, then disengage the ratchet mechanism to quickly extend the inner legs to reach the support surface below, such as the ground or other supporting surface. Then, use the ratchet mechanism to further extend the legs to raise the kingpin to a desired height and/or put the legs in a compression loading between the support surface and the kingpin.

The components of the kingpin stabilizer 20 may be made from any suitable structural material capable of supporting the tongue weight of the trailer including for example, metals, plastics, and composite materials. In the example shown, the stabilizer 20 is constructed of steel components. In certain applications, various components may be made from aluminum, such as but not limited to the kingpin-retaining bracket 22 and the inner leg 46. It is contemplated that the materials and dimensions of the kingpin stabilizer 20 are tailored to accommodate the weight of the trailer 10 and trailer loading exerted through the kingpin 16.

A method of stabilizing a kingpin may include hanging the stabilizer 20 from the kingpin and extending the telescoping legs to contact a supporting surface. The step of hanging may include engaging a kingpin-retaining bracket of a kingpin stabilizer onto the kingpin, where the kingpin-retaining bracket has a base plate and upwardly extending walls along at least two sides of the base plate, the upwardly extending walls and the base plate forming a receiving cavity, the upwardly extending walls spaced apart to fit the kingpin therebetween, each upwardly extending wall having a pin retainer. Then, the method including extending three telescoping legs extending from the pin-retaining bracket forming a tripod beneath the kingpin such that each telescoping leg contacts the ground.

The step of extending three telescoping legs may include moving a lever having a spring-loaded advance plate in a first direction, the advance plate engaging a ratchet wheel operably engaging a lower telescoping leg portion, the motion in the first direction rotating the advance plate and the ratchet wheel in forward rotation extending the lower telescoping leg portion.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A method of stabilizing a kingpin comprising the steps of:
    providing a kingpin stabilizer with a retaining bracket and a leg portion, the retaining bracket being defined by one or more walls extending upwardly from a baseplate to create a receiving cavity and at least one opening, one or more of the retaining bracket walls terminating with a kingpin retainer extending into the receiving cavity;
    slideably engaging the retaining bracket onto the kingpin by inserting the kingpin through the opening and into the receiving cavity in a direction generally parallel to the base plate; and
    extending the leg portion of the kingpin stabilizer to contact a support surface,
    wherein the step of extending the leg portion further comprises providing the kingpin stabilizer with three telescoping legs, and moving a lever comprising a spring-loaded advance plate in a first direction, the advance plate engaging a ratchet wheel operably engaging a lower telescoping leg portion, the motion in the first direction rotating the advance plate and the ratchet wheel in forward rotation extending the lower telescoping leg portion.

2. The method of claim 1, wherein the step of engaging the retaining bracket onto the kingpin further comprises inserting one or more kingpin retainers within a groove on the kingpin.

3. The method of claim 2, wherein the step of inserting one or more kingpin retainers within a groove on the kingpin further comprises orienting the retaining bracket horizontally relative to the support surface.

4. The method of claim 1, further comprising the step of locking the kingpin within the retaining bracket receiving cavity.

5. The method of claim 1, wherein the step of slideably engaging the retaining bracket onto the kingpin further comprises releasably engaging the kingpin by passing a flange of the kingpin through the opening in the retaining bracket wall.

6. A trailer stabilizing assembly comprising:
    a trailer kingpin comprising a main body that extends downward from a bottom surface of a stationary trailer into a flanged lower end;
    a retaining bracket that engages the kingpin flange and comprising a baseplate and a receiving cavity, the receiving cavity is defined by one or more walls extending upwardly from a periphery of the baseplate, at least one of the walls having an offset kingpin retainer that extends into the receiving cavity in an orientation that is substantially parallel to the baseplate; and
    one or more downwardly extending legs that extend towards a support surface and are operatively connected to the retaining bracket, at least one of the downwardly extending legs is a telescoping leg having a ratchet mechanism, wherein the ratchet mechanism comprises:
        a ratchet wheel operably engaging a telescoping leg portion,
        a spring-loaded lock plate that operably engages the ratchet wheel and resists backward rotation of the ratchet wheel, and
        a lever comprising a spring-loaded advance plate that engages the ratchet wheel such that motion of the lever in a first direction rotates the advance plate and the ratchet wheel in forward rotation that extends the telescoping leg portion.

7. The trailer stabilizing assembly of claim 6, where the trailer kingpin further comprises a groove that is disposed in between the kingpin main body and the flanged lower end, the groove having a diameter that is smaller than a diameter of the flanged lower end.

8. The trailer stabilizing assembly of claim 7, where the kingpin groove is received by the retaining bracket in a horizontal orientation with respect to a support surface.

9. The trailer stabilizing assembly of claim 6, where the one or more downwardly extending legs comprises three telescoping legs.

10. The trailer stabilizing assembly of claim 6, where the offset kingpin retainer is selected from the group consisting of a set screw, a clip, a rod, a pin, a bolt, and a collar, or any combination thereof.

11. The trailer stabilizing assembly of claim 6, further comprising a locking assembly comprising a lock aperture extending through the baseplate that is located adjacent to an entrance of the receiving cavity and a retainer that is inserted through the lock aperture.

12. The trailer stabilizing assembly of claim 11 where the retainer is selected from the group consisting of a padlock, a snap clip, a lock pin, a pin, and a clip.

13. A trailer stabilizing assembly comprising:
- a kingpin extending downward from the bottom surface of a stationary trailer, the kingpin having a main body attached at a first end to the bottom surface of the trailer and a flanged second end; and
- a stabilizer unit comprising a kingpin retaining bracket and a plurality of support legs, the retaining bracket having a baseplate, a wall extending a substantial distance around a periphery of the baseplate and upward therefrom, and an opening in the wall, the wall further comprising an inward facing flange along at least a part of its length in an orientation that is substantially parallel to the baseplate, and the stabilizing unit releasably engaging the kingpin by passing the kingpin flange through the opening in the retaining bracket wall,
wherein at least one of the plurality of support legs comprises a ratchet mechanism having:
- a ratchet wheel operably engaging a telescoping leg portion,
- a spring-loaded lock plate that operably engages the ratchet wheel and resists backward rotation of the ratchet wheel, and
- a lever comprising a spring-loaded advance plate that engages the ratchet wheel such that motion of the lever in a first direction rotates the advance plate and the ratchet wheel in forward rotation that extends the telescoping leg portion.

14. The stabilizing assembly of claim 13, where the kingpin flanged second end is releasably engaged within the retaining bracket in a horizontal orientation with respect to a support surface.

15. The stabilizing assembly of claim 13, where plurality of support legs comprises three telescoping legs that extend towards a support surface.

* * * * *